United States Patent [19]

Onda et al.

[11] 4,092,657
[45] May 30, 1978

[54] ELECTRICALLY OPERATED SHUTTER WITH A MECHANICAL CONTROL DEVICE

[75] Inventors: Eiichi Onda; Mitsuo Koyama; Tadashi Nakagawa, all of Yotsukaido, Japan

[73] Assignee: Seiko Koki Kabushiki Kaisha, Japan

[21] Appl. No.: 636,727

[22] Filed: Dec. 1, 1975

[30] Foreign Application Priority Data

Dec. 3, 1974 Japan .......................... 49-146572[U]

[51] Int. Cl.² ........................... G03B 9/08; G03B 9/62
[52] U.S. Cl. ..................................... 354/234; 351/258
[58] Field of Search ............... 354/234, 235, 256, 258, 354/260, 267

[56] References Cited

U.S. PATENT DOCUMENTS

| | | | |
|---|---|---|---|
| 3,777,646 | 12/1973 | Shimizu | 354/235 |
| 3,829,877 | 8/1974 | Kitai | 354/258 |
| 3,847,475 | 11/1974 | Kitai et al. | 354/234 |
| 3,927,416 | 12/1975 | Inoue | 354/235 |

Primary Examiner—L. T. Hix
Assistant Examiner—M. L. Gellner
Attorney, Agent, or Firm—Robert E. Burns; Emmanuel J. Lobato; Bruce L. Adams

[57] ABSTRACT

An electrically operated shutter in which an exposure aperture is opened by actuation of a shutter blade opening member and closed by actuation of a shutter blade closing member and exposure time is controlled in accordance with the duration of excitation of an electromagnet. The shutter is comprised of a disengaging member for causing said shutter blade closing member to actuate upon being attracted to the electromagnet during excitation thereof, and an engaging member for causing the shutter blade opening member to actuate upon being actuated by the movement of a control member if the shutter is released. When the electromagnet is not normally energized, the disengaging member is engaged by a cam portion of the engaging member on the initial operating period of shutter release and disengaged upon lapse of a preselected time from the shutter opening operation.

1 Claim, 1 Drawing Figure

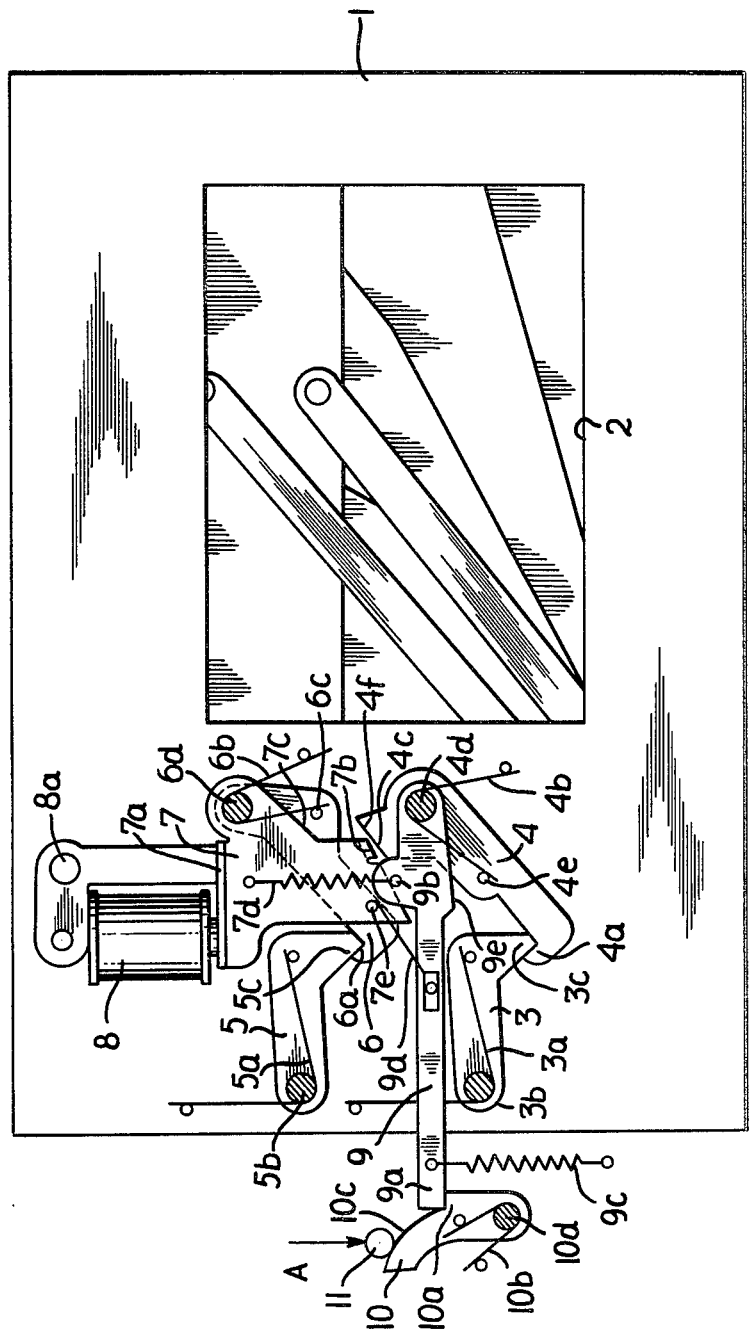

ELECTRICALLY OPERATED SHUTTER WITH A MECHANICAL CONTROL DEVICE

BACKGROUND OF THE INVENTION

The present invention relates to an electrically operated camera shutter with a mechanical control device, and more particularlly to an electrically operated camera shutter permitting automatic control of shutter speed mechanically as well as electronically.

The most important disadvantage of conventional electrically operated shutters is the danger of it being impossible to control shutter speed when an electric cell powder source has discharged. In other words, there is danger of making it impossible to take a picture because an electromagnet actuates the shutter closing member before the shutter opening member is actuated. In order to avoid this disadvantage there has been proposed various methods: a mechanical delaying mechanism can automatically operate if the electromagnet does not actuate; a mechanical delaying mechanism may be previously set so as to make exposure for at least the shortest controllable exposure time, even if the electromagnet is inoperative; and the operation members may be actuated in accordance with a predetermined timing sequence so as to operate at the shortest controllable exposure time independently of the condition of the electromagnet. The first method however has faults: a complex mechanism and accordingly low reliability of operation, great expense of manufacture and others. According to the second and third methods the mechanisms are simplified compared with that of the first method but, owing to mechanical control, exposure time is unstable if its shortest controllable value is preselected to be shorter than, for example, 1/2,000 sec. For increase of the exposure time stability improvement of the precision with which the parts of the stabilization mechanism are manufactured is required, which results in increased cost of manufacture. The choice of the second and third methods for determining the shortest controllable exposure time on the basis of the unstability of mechanical control neglects the fact that the shortest exposure time controllable electromagnetically is more stable, and is a bottle neck against realization of the shortest exposure time required for the desired high speed photography.

BACKGROUND OF THE INVENTION

An object of the present invention is to avoid the aforesaid faults and this is accomplished by a disengaging member, controllable by an electromagnet, which is restrained by an engaging member for engaging an opening blade driving lever in the position for preventing a termination of exposure when the electromagnet does operate, and the restraint is released after said engaging member disengages the opening blade driving lever.

BRIEF DESCRIPTION OF THE DRAWING

The drawing is a plan view of a shutter according to the present invention with the shutter cocked.

DESCRIPTION OF THE PREFERRED EMBODIMENT

Referring now in detail to the drawing which shows a shutter according to the present invention, which is in set position. On the base plate 1 of the shutter is found an exposure aperture 2 for passage of light. An opening blade driving lever 3 is pivotally mounted on axis 3b and urged in the clockwise direction by a spring 3a. The tab 3c of the lever 3 is engaged by the hook portion 4a of an engaging hook lever 4 which is pivotal on axis 4d and pressed in the clockwise direction by a spring 4b. The cam portion 4c of the lever 4 is arranged eccentrically with the axis 4d. A closing blade driving lever 5 is pivotally mounted on axis 5b and urged in the clockwise direction by a spring 5a. The tab 5c of the lever 5 is engaged by the hook portion 6a of a engaging hook lever 6. The lever 6 is pivotally mounted on axis 6d and urged in the clockwise direction by a spring 6b. An armature lever 7 is pivotal on axis 6d coaxially with the hook lever 6 of the closing blade driving lever 5. The magnetizable armature portion 7a of the armature lever 7 is always pressed against an oposite electromagnet 8, which is secured with a securing screw 8a on the base plate 1, under the action of a spring 9d secured on a control lever 9. The electromagnet 8 is energized by known means during continuation of exposure under control by a known electronic switching circuit (not shown). The spring 7d acting on the armature lever 7 is hooked with its end to the spring hooking pin 9b of the control lever. The control lever 9 is pivotally mounted on the axis 4d coaxially with the lever 4 and urged in the counterclockwise direction by a spring 9c. It is so considered that the coil spring 9c on the control lever 9 has a stronger force than the sum force of the torsion spring 4b and the coil spring 7d. Also against the clockwise swinging action of the spring 9c, the free end 9a of the control lever rests on the step 10a of the engaging step lever 10. A torsion spring 9d for pressing the armature lever 7 against the electromagnet is secured to the control lever 9. The spring 7d is so tensioned that after the control lever 9 is pivoted counterclockwise under the action of the spring 9c, as the result the force pressing the armature lever 7 against the electromagnet 8 by the spring secured on the control lever 9 is released and further turn of the lever 9 causes detachment of the armature lever 7 from the electromagnet 8. The engaging step lever 10 is mounted privotally on axis 10d and urged in the clockwise direction by a spring 10b. Its clockwise movement is blocked by engagement of its cam portion 10c with the pin 11 of a release lever (not shown).

When the electromagnet actuates normally, the abovementioned shutter works as follows:

If the shutter, at a set position as shown in the drawing, is released, the electrical circuit is connected by known means to a power source. Then the electromagnet is energized, and as the result the armature portion 7a of the armature lever 7 is attracted thereto, as shown in the drawing. On the other hand the pin 11 of the release lever (not shown) actuates the cam portion 10c of the engaging step lever 10 in the direction of an arrow A. The lever 10 is swung counterclockwise against the spring 10, and this movement results in disengagement between the step 10a of the lever 10 and the free end of the control lever 9. Then the lever 9 is pivoted counterclockwise under the action of the spring 9c. As the result the torsion spring 9d secured on the control lever 9 disengages the pin 7e of the armature lever 7, and accordingly the force pressing the armature portion 7a against the electromagnet 8 is released. The counterclockwise movement of the lever 9 also causes tension of the spring 7d hooked to the pin 9b of the control lever 9, which is sufficient to permit the armature lever to release from the electromagnet 8 if not energized. In this case however the armature portion 7a is attracted to the electromagnet 8, and the armature lever 7 remains in the position shown in the drawing. The control lever 9 moves on and its step 9e strikes the pin 4e on the engaging hook lever 4, as the result the lever 4 is swung counterclockwise. Then the hook portion 4a of the lever 4 disengages the tab 3c of the opening blade driving lever 3. The lever 3 is swung clockwise under the action of the spring 3a. In this case, no engagement occurs between cam portions 4c and 4f and the bottom edge 7b of the armature lever. About the time when the lever 3 begins to move, a signal for indicating this movement is given to the electric circuit (not shown) by known means. The movement of the lever 3 causes the opening blade to swing whereby the exposure aperture 2 is opened. After a preselected period of exposure lapses, the electromagnet 8 is deenergized by the electronic switching circuit and the armature portion 7a is set free. Then the armature lever 7 is swung counterclockwise by the spring 7d and its step portion 7c strikes the pin 6c of the engaging hook lever 6. As the result the lever 6 is pivoted counterclockwise against the action of the spring 6b. Then the hook portion 6a of the lever 6 disengages the tab 5c of the closing blade driving lever 5 and the lever 5 turns clockwise under the action of the spring 5a. The closing blade is driven and the exposure is terminated. In this way an exposure process is accomplished.

Operation is similar when it is impossible to cause the electromagnet 8 to normally energize or actuate due to discharge of an electric cell or troubles of the electrical circuit or the like. The electromagnet 8 is not energized so that the armature lever 7 is urged in the position shown in the drawing merely by the spring 9d secured on the control lever 9. If the shutter which is set at shown in the drawing is released, the pin 11 of the release lever (not shown) is driven in the direction of the arrow A. Consequently the step portion 10a of the engaging step lever 10 disengages the free end 9a of the control lever 9. Then the control lever 9 turns counterclockwise under the action of the spring 9c and releases the armature lever 7 from pressing against the electromagnet by the spring 9d secured on the control lever 9. The lever 9 moves on and cause tension of the spring 7d hooked to the pin 9b. As the result the armature lever 7 is swung counterclockwise by the action of the spring 7d because its armature portion 7a is not attracted to the electromagnet 8 which in this case is not in an energized state. This movement is stopped by engagement of the bottom edge 7b of the lever 7 with the cam portion 4c of the lever 4. Accordingly the engaging hook lever 6 is not yet actuated. Further turn of the control lever 9 forces its step portion 9e to cause the lever 4 to swing in a counterclockwise direction against the action of the spring 4b. The hook portion 4a disengages the tab 3c of the opening blade driving lever 3. The lever 3 then is swung clockwise under the action of the spring 3a. This movement causes the opening blade to swing and the exposure aperture 2 is opened. The control lever 9 still moves on and causes the lever 4 to further swing counterclockwise. As the result the spring 7d is subjected to tension. Then the armature lever 7 is lifted due to engagement of its step portion with the cam portion 4f of the engaging hook lever 4, and caused by its own inertia to clockwise turn against the action of the spring 7d or forced to swing till its armature portion 7a come into contact with the electromagnet 8. After that the armature lever 7 is urged to swing counterclockwise under the action of the spring 7d and thus the step portion 7c strikes the pin 6c of the engaging hook lever 6 without being constrained, because, when the armature lever 7 swings to arrive at the position where it reengages with the engaging hook lever 4, the engaging hook lever 4 already has been swung counterclockwise. Then the engaging hook lever 6 is swung counterclockwise against the force of the spring 6b and its hook portion 6a disengages the tab 5c of the closing blade driving lever 5. The lever 5 is pivoted clockwise under the action of the spring 5a. This movement causes the closing blade to turn, and the exposure aperture is closed. In this way this exposure is accomplished.

In the abovedescribed embodiment, the cam portion 4c of the engaging hook portion 4 is shaped eccentrically so that the bottom edge 7b of the armature lever 7 can be lifted. It also can be formed as an arc-shape portion concentric with the axis 4d and the member of operation is as follows: The tab portion 7b of the armature lever 7 is carried by the cam portion 4c of the engaging hook lever 4 to prevent engagement of the step portion 7c with the engaging hook lever 6. Besides it is not disengaged from the cam portion 4c of the engaging hook lever 4 until the opening blade driving lever 3 turn on for a constant time to open the exposure aperture 2 and then exposure begins. Thereafter as in the preceding manner of operation, the closing blade driving lever 5 is disengaged, and the exposure is accomplished.

As mentioned above, the shutter according to the present invention permits exposure time control for high speed (such as 1/2,000 sec) photography when the electromagnet actuates normally because engaging hook lever 4 disengages the opening blade driving lever under the condition that there is no engagement between the amature lever and the engaging hook lever or the condition unloaded with the armature lever. When electromagnet does not actuate, the engaging hook member disengages the opening blade driving lever under the condition loaded with the armature lever. For this mechanical operation of the shutter, the range of controllable exposure time can be desirably entended by a suitably shaped cam portion of the engaging hook lever 4. Moreover the shutter according to the present invention brings about the technical advantages: no additional parts for detecting whether the electromagnet is energized are required, and the structure of the shutter can be simplified. Finally the above mechanism can be easily applied to lens shutters as well as focal plane shutters described as an example in the disclosed embodiment.

We claim:

1. In a shutter mechanism including an aperture and shutter blades positionable for opening and closing said aperture, the improvement comprising:
    (a) a shutter blade opening lever having a cocked position and a released position for positioning said shutter blades to open said aperture when moved from the cocked to the released position;
    (b) a hook lever for engaging said shutter blade opening lever when the same is in the cocked position;
    (c) a shutter blade closing lever having a cocked position and a released position for positioning said shutter blades to close said aperture when moved from the cocked to the released position;

(d) a second hook lever for engaging said shutter blade closing lever when the same is in the cocked position;
(e) an electromagnet energizable for controlling exposure time;
(f) an armature lever having a magnetizable first end portion proximate said electromagnet, means for releasing said second hook lever to a second end portion thereof remote from said magnetizable first end portion to release said closing lever, and means for engaging the first-mentioned hook lever to maintain said armature lever positioned to permit release of said opening lever before said means for releasing said second hook lever releases said second hook lever to release said closing lever;
(g) biasing means for biasing said armature lever away from said electromagnet to engage said first hook lever and release said second hook lever; and
(h) a control lever manually operable for releasing the first-mentioned hook lever to release said opening lever.

* * * * *